US011722488B2

(12) United States Patent
Kuarsingh et al.

(10) Patent No.: US 11,722,488 B2
(45) Date of Patent: Aug. 8, 2023

(54) NON-INTRUSIVE / AGENTLESS NETWORK DEVICE IDENTIFICATION (71) Applicant: Cujo LLC, El Segundo, CA (US)

(72) Inventors: Victor Kuarsingh, Doral, FL (US); Leonardas Marozas, Vilnius (LT); Filip Savin, Vilnius (LT); Jovaldas Januskevicius, Kaunas (LT); Justinas Bisikirskas, Kaunas (LT)

(73) Assignee: Cujo LLC, Walnut, CA (US)

( * ) Notice: Subject to any disclaimer, the term of this patent is extended or adjusted under 35 U.S.C. 154(b) by 209 days.

(21) Appl. No.: 16/942,188

(22) Filed: Jul. 29, 2020

(65) Prior Publication Data
US 2022/0038454 A1 Feb. 3, 2022

(51) Int. Cl.
*H04L 9/40* (2022.01)
*H04W 12/71* (2021.01)
*G06F 16/2458* (2019.01)

(52) U.S. Cl.
CPC ...... *H04L 63/0876* (2013.01); *G06F 16/2477* (2019.01); *H04L 63/1425* (2013.01); *H04L 63/20* (2013.01)

(58) Field of Classification Search
CPC . H04L 63/0876; H04L 63/1425; H04L 63/20; H04L 63/029; H04L 63/0227; H04L 63/1408; H04L 63/166; G06F 16/2477
See application file for complete search history.

(56) References Cited

U.S. PATENT DOCUMENTS

| | | | | |
|---|---|---|---|---|
| 9,460,390 B1* | 10/2016 | Lin | ......................... | G06N 7/01 |
| 9,860,324 B1* | 1/2018 | Roskind | ................ | H04L 67/141 |
| 9,936,028 B2* | 4/2018 | Ganu | .................... | H04L 67/142 |
| 10,601,800 B2* | 3/2020 | Kao | ........................ | H04L 63/102 |
| 10,742,647 B2* | 8/2020 | Crabtree | ............. | H04L 63/0876 |
| 2015/0149651 A1* | 5/2015 | Yasukawa | ............... | H04L 69/24 709/230 |
| 2016/0155128 A1 | 6/2016 | Desai et al. | | |
| 2018/0034798 A1* | 2/2018 | Vincent | ................. | G06F 21/313 |

(Continued)

OTHER PUBLICATIONS

Li et al., "Securing App Behaviors in Smart Home: a Human-App Interaction Perspective," 2020 IEEE 26th International Conference on Parallel and Distributed Systems (ICPADS) Year: 2020 | Conference Paper | Publisher: IEEE.*

(Continued)

*Primary Examiner* — Roderick Tolentino
(74) *Attorney, Agent, or Firm* — Dority & Manning, P.A.

(57) ABSTRACT

Maintaining a database of a plurality of time series data sets, wherein each time series data set is associated to a previously known computer device of a computer network; detecting a connection request from a second computer device of the computer network; collecting one or more new data sets related to the second computer device; comparing the one or more new data sets with one or more time series data sets; calculating one or more value scores related to the plurality of time series data sets based on the comparison; and determining a device association score based on the calculated one or more value scores related to the plurality of time series data sets, wherein the device association score determines an association level between the previously known computer device and the second computer device of the computer network.

19 Claims, 7 Drawing Sheets

(56) References Cited

U.S. PATENT DOCUMENTS

2018/0159852 A1* 6/2018 Crabtree ............. H04L 63/1433
2018/0191743 A1* 7/2018 Reddy .................... G06N 20/00
2018/0270229 A1 9/2018 Zhang et al.
2019/0043054 A1* 2/2019 Crank ................... H04W 12/08

OTHER PUBLICATIONS

Massacci et al., "Towards Practical Security Monitors of UML Policies for Mobile Applications," 2020 IEEE International Conference on Advances in Electrical Engineering and Computer Applications( AEECA) Year: 2020 | Conference Paper | Publisher: IEEE.*

Uluagac, A.S. et al., "A Passive Technique for Fingerprinting Wireless Devices with Wired-side Observations," 2013 IEEE Conference on Communications and Network Security (CNS), Oct. 14-16, 2013, IEEE, pp. 305-313.

Extended European Search Report for European Patent Application No. 21184342.0, dated Dec. 14, 2021, 8 pages.

* cited by examiner

1,3 = 3.16
4,1 = 4.12
-1,-2, = 2.23
==
<< OPT_Owner >> (3.16) + << DHCP_TRANS >>(4.12) - << Hostname >> 2.23 = 5.05

FIG. 8

| |
|---|
| Collected Data (Transaction ID: DHCP Protocol Header |
| ▼Dynamic Host Configuration Protocol (Discover) |
|     Message type: Boot Request (1) |
|     Hardware type: Ethernet (0x01) |
|     Hops: 0 |
|     Transaction ID: 0x8232d14f |
|     Seconds elapsed: 0 |
|   ▶ Boot flags: 0x0000 (Unicast) |
|     Client IP address: 0.0.0.0 |
|     Your (client) IP address: 0.0.0.0 |
|     Next server IP address: 0.0.0.0 |
|     Relay agent IP address: 0.0.0.0 |
|     Client MAC address:                      |
|     Client hardware address padding: 00000000000000000000 |
|     Server host name not given |
|     Boot file name not given |
|     Magic cookie: DHCP |
|   ▶ Option: (53) DHCP Message Type (Discover) |
|   ▶ Option: (55) Parameter Request List |
|   ▶ Option: (57) Maximum DHCP Message Size |
|   ▶ Option: (61) Client identifier |
|   ▶ Option: (51) IP Address Lease Time |
|   ▶ Option: (12) Host Name |
|   ▶ Option: (255) End |
|     Padding: 000000000000000000000000000000000000 |

Table 1. Use case example of distancing processing

FIG. 9

NON-INTRUSIVE / AGENTLESS NETWORK DEVICE IDENTIFICATION

TECHNICAL FIELD

The present application relates generally to network security, and specifically to identifying devices in a computer network.

BACKGROUND

Both home and enterprise networks nowadays host a range of consumer and business endpoints that operate or communicate locally and/or across the Internet. Devices on protected home or enterprise networks are commonly subject to usage and communication policies set out by the administrator of the environment. To effectively manage devices in these environments and correctly enforce appropriate policies, managements systems can be deployed that interact with other network or service infrastructures to allow, restrict, or otherwise control the device communications and content access.

SUMMARY

According to an aspect of the invention there is provided a method as specified in the claims.

According to other aspect of the invention, there is provided an apparatus in a computer network system as specified in the claims.

According to other aspect of the invention, there is provided a non-transitory computer-readable medium comprising stored program code, the program code comprised of computer-executable instructions that, when executed by a processor, causes the processor to operate as specified in the claims.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

The figures and the following description relate to the example embodiments by way of illustration only. Alternative embodiments of the structures and methods disclosed herein will be readily recognized as viable alternatives that may be employed without departing from the principles of what is claimed.

Both home and enterprise networks nowadays host a range of consumer and business endpoints that operate or communicate locally and/or across the Internet. Devices on protected home or enterprise networks are commonly subject to usage and communication policies set out by the administrator of the environment. To effectively manage devices in these environments and correctly enforce appropriate policies, managements systems can be deployed that interact with other network or service infrastructures to allow, restrict, or otherwise control the device communications and content access.

One approach to identifying devices in a computer network is to use network behaviour analysis where behaviour related data is collected and analysed to fingerprint devices. This can be effective when the aim is to categorize specific devices. However, behaviour and identification related data is vulnerable for tampering and can be changed at any point in time by a potential attacker, device manufacturer or the user. Further, in reaction to increasing needs for user privacy protection when attached to public networks or unprotected networks, it has become common for the device/operating system vendors to implement various identity protection measures that are designed to obfuscate the user or device identity. Examples of such measures include changing, modifying or randomly assigning network-based identifying data, such as a Medium Access Control (MAC) address and a hostname, for devices. Some known mobile device management solutions trying to overcome the challenges of MAC randomization are known but they require installing agents on mobile devices.

It is vital to identify network devices in a computer network to enable, for example, controlling access to computer networks or services, applying required communication policies, and/or preventing and monitoring unauthorized access.

Figure 1:
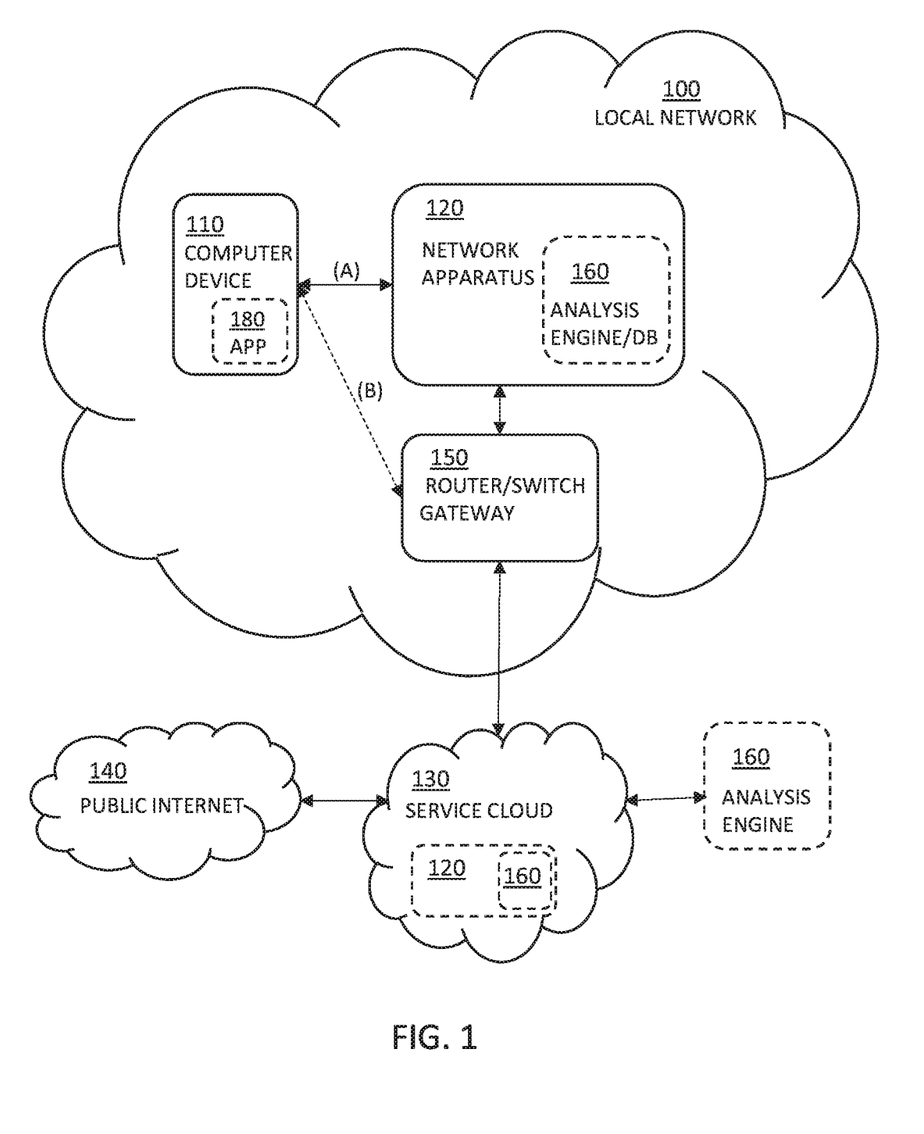
FIG. 1 illustrates an example system environment for a network apparatus in a computer network system.

FIG. 1 illustrates schematically an example of a system environment for a network apparatus 120. The system environment illustrated in FIG. 1 includes a computer network 100, such as a local network, that may include one or more computer devices 110 with a client application 180, the network apparatus 120, a local router/switch 150, and an analysis engine and a database 160. The example system also includes a service cloud 130, such as a network operator's cloud and the Internet 140. The analysis engine/database 160 may reside in the computer network, in the service cloud 130 or elsewhere in the network. There may also be more than one analysis engines 160 thus enabling at least part of the analysis being processed in more than one analysis engines. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

In an embodiment, the device 110 may communicate (A) via the network apparatus 120 residing in the computer network 100. In another embodiment, the device 110 may communicate (B) directly via a network gateway or a modem 150, for example when the device is not in the computer network 100. In an embodiment, the network operators may deploy a service platform on their broadband gateways 150 provided to customers and in their own cloud environments 130. The user device(s) 110 may also be configured to use the services provided by the service cloud 130 by one or more applications/operating systems 180 installed on the device(s) 110.

The device 110 may be any computer device, such a smart device, a smart appliance, a smart phone, a laptop or a tablet. The network apparatus 120 collects information e.g. about the computer network 100, including data about the network traffic through the computer network 100 and data identifying devices in the computer network 100, such as any smart appliances and user devices 110. The network apparatus 120 is configured to receive traffic control instructions from the analysis engine 160 and to process network traffic based on the traffic control instructions. Processing the network traffic through the computer network 100, for example, can include enforcing network or communication policies on devices, restricting where network traffic can travel, blocking network traffic from entering the computer network 100, redirecting a copy of network traffic packet or features of those packets to the analysis engine 160 for analysis (e.g., for malicious behaviour), or quarantining the network traffic to be reviewed by a user (e.g., via the user device 110) or network administrator. In some embodiments, the functionality of the network apparatus 120 is performed by a device that is a part of the computer network 100, while in other embodiments, the functionality of the network apparatus 120 is performed by a device outside of the computer network 100.

The network apparatus 120 may be configured to monitor traffic that travels through the computer network 100. In some embodiments, the network apparatus 120 can be a device that is a part of the computer network 100. The network apparatus 120 can be connected to the computer network 100 using a wired connection (e.g. via en Ethernet cable connected to a router) or using a wireless connection (e.g. via a Wi-Fi connection). In some embodiments, the network apparatus 120 can comprise multiple devices. In some embodiments, the network apparatus 120 can also perform the functions of the local network router 150 for the computer network 100.

In some embodiments, the network apparatus 120 may intercept traffic in the computer network 100 by signalling to the user device 110 that the network apparatus 120 is a router 150. In some embodiments, the network apparatus 120 replaces the default gateway or gateway address of the computer network 100 with its own Internet protocol address. In some embodiments, the computer network 100 can be structured such that all network traffic passes through the network apparatus 120, allowing the network apparatus 120 to physically intercept the network traffic. For example, the network apparatus 120 can serve as a bridge through which all network traffic must travel to reach the router 150 of the computer network 100.

The analysis engine 160 may receive and analyze network traffic data (e.g., forwarded by the network apparatus 120) associated with devices on the computer network. The analysis engine 160 may be implemented within a remote system (e.g., a cloud server) or within the computer network 100. The analysis engine 160 may perform operations that are computationally expensive for the network apparatus 120 to perform. In some embodiments, the analysis engine 160 replaces the network apparatus 120 by performing the functionalities of the network apparatus 120. In these embodiments, the computer network router 150 may be configured to forward network traffic to the analysis engine 160. In some embodiments, the analysis engine 160 communicates with other devices on the computer network. In some embodiments, the analysis engine 160 is integrated into the network apparatus 120.

The computer network 100 may be a local area network (LAN) that comprises the one or more devices 110, network apparatus 120, and local network router 150. The computer network 100 may be used for a number of purposes, including a home network or a network used by a business. The computer network 100 is connected to the Internet or other Inter-autonomous network infrastructure 140, allowing devices within the computer network 100, including the user device 110, to communicate with devices outside of the computer network 100. The computer network 100 may be a private network that may require devices to present credentials to join the network, or it may be a public network allowing any device to join. In some embodiments, other devices, like personal computers, smartphones, or tablets, may join computer network 100.

The internet 140 and the computer network 100 may comprise any combination of LANs and wide area networks (WANs), using both wired and wireless communication systems. In some embodiments, the internet 140 and the computer network 100 use standard communications technologies and protocols. Data exchanged over the internet 140 and the computer network 100 may be represented using any suitable format, such as hypertext markup language (HTML) or extensible markup language (XML) or any other presentation or application layer format suitable for transporting data over a network. In some embodiments, all or some of the communication links of the internet 140 and the computer network 100 may be encrypted using any suitable technique or techniques.

The computer device 110 may be a computing device capable of receiving user input as well as transmitting and/or receiving data via the Internet 140 or computer network 100. In some embodiments, the device 110 is a conventional computer system, such as a desktop or a laptop computer. Alternatively, the device 110 may be a device having computer functionality, such as a personal digital assistant (PDA), a mobile telephone, a smartphone, or another suitable device. The device 110 is a network device configured to communicate with the Internet 140 or computer network 100. In some embodiments, the device 110 executes an application (e.g., application 180) allowing a user of the user device 110 to interact with other network devices, such as the smart appliances, the network apparatus 120, the router 150, or the analysis engine 160. For example, the device 110 executes a browser application to enable interaction between the device 110 and the network apparatus 120 via the computer network 100.

The client application 180 is a computer program or software application configured to run on the user device 110. For example, the application 180 is a web browser, a mobile game, an email client, or a mapping program. The device 110 can have any number of applications 180 installed. The application 180 may communicate, via the user device 110, with devices inside and outside of the computer network 100.

The computer network 100 can also be a small office and/or a domestic network that comprises several Internet of Things (Iot) and smart devices as well as portable computers and tablet computers, for example. At least part of these devices are connected to the Internet 140, for example, via one or more WiFi access points.

It is common for home and enterprise networks to host a range of consumer and business endpoints that operate or communicate both locally and/or across the Internet. These devices may comprise both traditional computer hosts, peripherals, Internet of Things (Iot) devices, computing tablets, smart phones, smart accessories (e.g. smart watches) and other personal communication devices. A class of these devices, such as computing tablets, smart phones and smart accessories are typically used both on the protected home or enterprise networks and in public or unprotected networks. Such usage patterns are typical of this device class and are often used in BYOD (bring your own device) frameworks when used in enterprise or other business networks.

The devices on protected home or enterprise networks are commonly subject to usage and communication policies set out by an administrator of the environment. To effectively manage the devices in these environments and to correctly enforce appropriate policies, for example, management systems are deployed that interact with other network or service infrastructure to allow, restrict, or otherwise control the device communications and content access.

Device identity obfuscation measures often may impede systems designed to track and enforce administrator policies when these devices are attached to the protected network. Network administrators, if unable to identify devices, may inadvertently lose their ability to enforce legitimate policy on device communications. Traditional management systems and solutions on controlled environments have typically focused identifying devices utilizing information programmed into the device by the manufacturer or the operating system. The most common unique identifier used by critical management systems is the MAC address. The stability and uniqueness of this identifier has made this practice common and easy to implement. However, one specific method some vendors have taken for devices that operate on Wireless and Ethernet networks is to masquerade (change/modify) the hardware address (MAC or Media Access Control) when used on public networks. The MAC address is the most common unique identifier leveraged by communication provider and enterprise tools used to manage and apply policies. The removal of this identifier breaks the method used by common and custom tools to map devices to user profiles. Other local device configurations systems, such as DHCP (Dynamic Host Configuration Protocol), which assign and control resources based on the MAC address will also no longer be optimize or function correctly with rotating or changing MAC addresses. These obfuscation methods are often also deployed, purposefully or inadvertently, on administer protected home and enterprise networks.

The MAC address has traditionally been used by devices and operating systems on both wired Ethernet connections and wireless (WiFi) connections. This ubiquitous use across all interfaces, with a stable and predictable value, has made identification of devices reasonable easy to develop management systems. MAC addresses, when assigned by a vendor, follow the rules set out by the Institute of Electrical and Electric Engineers (IEEE) using the EUI-48 standard. This assigned space is referred to as the OUI (Organizationally Unique Identifier) range. The EUI-48 format also allows for locally assigned MAC addresses, in which utilizes globally unassigned MAC ranges referred to as the CID (Company ID) range.

These new practices, although beneficial for privacy and promote user anonymity, also remove the most common predictable values used by management systems to identify devices and apply proper or intended policy. When used in public networks, randomized MACs, for example, do not contribute to problematic behaviour since most devices are only attached to these networks for short periods of time (normally <24 hrs), and therefore a changing MAC does not pose an issue. Also, most public networks enable captive portals by which to further authenticate users.

Vendor and operating system practices now assign different MACs to separate wireless network zones (associated to SSIDs) and wired connections. Some vendors also rotate or assign new random MACs on a time interval basis, creating further unpredictability to end user devices when used in protected and controlled networks.

In addition to a different MAC, vendors have also applied randomized values to data sets that are derived from the device MAC. An example of this is auto generated IPv6 addresses in SLAAC (Stateless Auto Address Configuration) which follow the Modified EUI-64 addressing format based on the device MAC address as specified in the Internet Engineering Task Force standard RFC4291.

Many organizations and systems are tuned to use the MAC address and other unique values such as a UDID (Unique Device Identifier) or UUID (Universally Unique Identifier) to uniquely identify devices on a network and associate the devices to system profiles. Since vendors have now enabled randomization these traditionally stable values, network administrators need systems that are able to identify devices without stable and predictable values and data sets in a non-intrusive way or use other methods such as MDM (mobile device management) solutions.

Without new capabilities, most deployed systems would no longer be able to function or apply needed policy to devices that enable such randomization (such as MAC randomization). Other values, such as those configured by the end user, like a "hostname", are not guaranteed to be unique and therefore do not provide a stable unique and predictable identifier Thus, there are needs for methods that enable identification and association of devices using data sets that are dynamic in nature and change over time. The methods should be able to operate in a manner which is non-intrusive and does not require a device to behave in a way which causes it to send additional information to the network than necessary for normal communications and function.

Embodiments of the present invention overcome the drawbacks of the previous solutions by applying new capabilities and design methods targeted to match dynamic data from active (communicating) devices on a network to previous time series data sets. Data, values or attributes are extracted from devices actively communicating on a network and process the data for a comparison to time series data sets that are associated with a predetermined identifier value (SEED). The SEED identifier value need not be persistent or stable and can change over time.

Figure 2:
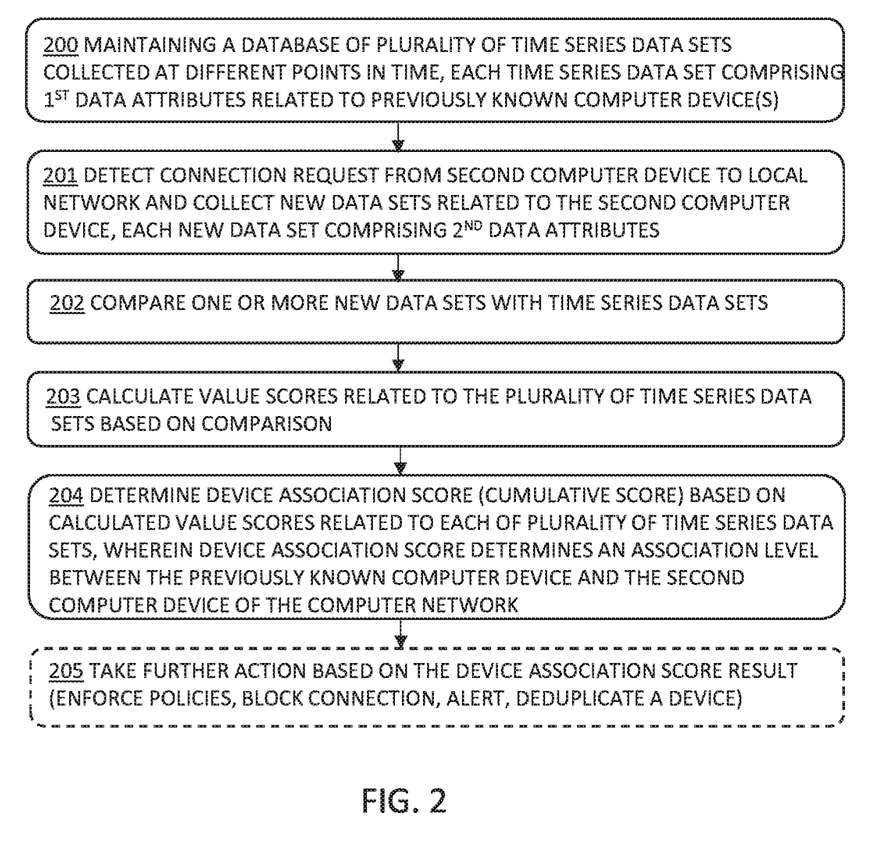
FIG. 2 illustrates an example method, according to one embodiment.

FIG. 2 is a flow diagram illustrating an embodiment of a method.

In 200, a database of a plurality of time series data sets collected at different points in time is maintained, wherein each time series data set is associated to a previously known computer device of a computer network and comprises one or more first data attributes extracted from network traffic data of the previously known computer device.

In 201, a connection request from a second computer device of the computer network is detected and one or more new data sets related to the second computer device are collected, wherein each data set of the one or more new data sets comprises one or more second data attributes extracted from network traffic data of the second computer device.

In 202, the one or more new data sets related to the second computer device are compared with one or more time series data sets of the plurality of time series data sets maintained in the database. Data sets extracted from the second computer device may be processed by way of truncation, modification, or have an algorithm applied, before the comparison is started.

In some embodiments the data to be compared may be pre-processed, such as applying a function or algorithm to the data to modify the data, prior to making any comparisons.

In 203, one or more value scores related to the plurality of time series data sets based on comparing the one or more new data sets related to the second computer device with the one or more time series data sets of the plurality of time series data sets are calculated.

In 204, a device association score is determined based on the calculated one or more value scores related to the plurality of time series data sets, wherein the device association score determines an association level between the previously known computer device and the second computer device of the computer network.

In 205, in an embodiment, further action can be taken based on the device association score determination result.

In an embodiment, the compared one or more new data sets related to the second computer device and one or more time series data set of the plurality of time series data sets are related to specific network protocols used on the computer network. The specific network protocols may comprise one or more of: Dynamic Host Configuration Protocol Version 4 (DHCPv4), Dynamic Host Configuration Protocol Version 6 (DHCPv6), Multicast Domain Name Service (mDNS), Simple Service Discovery Protocol (SSDP), Universal Plug-n-Play Messages (UPnP Messages), ICMPv6, and other local area network discovery, configuration and control protocols. In some embodiments, data extracted from the communicating device targets protocols commonly active in local networks.

In an embodiment, the data extracted from the communicating devices target protocols commonly active in local networks.

In an embodiment, the first and second data attributes extracted from the network traffic data comprises one or more of: a Media Access Control (MAC) address, a hostname, a transmission sequence number, a communication timestamp, a communication protocol value, a source port, a server name indication, a Transmission Control Protocol (TCP) window size, a total length of packet, a referrer, and any network-based identifier data.

In an embodiment, the method further comprises setting one or more primary identifier values (SEED) related to the previously known computer device based on the one or more first data attributes, and the determining of the device association score is further based on the one or more primary identifier values.

In an embodiment, one or more matching algorithms are used in one or more steps of: comparing the one or more new data sets related to the second computer device with the one or more time series data sets of the plurality of time series data sets; calculating the one or more value scores related to each of the plurality of time series data sets; and determining the device association score.

In an embodiment, the step of comparing the one or more new data sets related to the second computer device with the one or more time series data sets further comprises using distance comparison and/or dynamic value matching. The distance comparison may comprise one or more of: a numerical and/or alphanumerical comparison to previous time series values to determine a distance between the first and second attributes; comparing a distance to time offset from time series to determine a relative match; and determining a non-match to establish negative associations. The distance is expressed in an absolute value such as an integer or floating point value, or can also be expressed as a vector when using a four quadrant plot with weighted measures (y-axis) and distance (x-axis) based on the quality of the data set being compared. The dynamic value matching may comprise one or more of: comparing the first and second data attributes on a byte by byte basis to establish a pattern match; and comparing to a full time series data set to find a direct positive match, or to establish one or more known negative matches which can include falling outside the observed bounds (value) of previously known values In an embodiment, the step of comparing the one or more new data sets related to the second computer device with the one or more time series data set further comprises evaluating quality of the one or more new data sets by using relative plot scoring, and wherein the device association score further determines a relative weight of the quality of the comparison and an absolute value of the comparison.

In an embodiment, the further action taken comprises one or more of: enforcing a network and/or a communication policy on the second computer device; blocking or preventing a network connection; blocking a connection request; providing a security alert; initiating further security analysis actions for analysing the one or more computer devices and/or the computer network; and deduplicating a computer device from a database.

In an embodiment, data is processed by applying mathematical operations such as adding, subtracting, factoring or truncating information for further comparison with time series data. In some embodiments, the same information will be processed multiple times (separate algorithms) to create multiple vectors by which to compare to the same time series data sets. Time series data sets may be identified by the protocol which generated the values and further associated with neighbour data sets that were generated by the same device (seed). The SEED used in this context may be, but is not limited to, a randomized MAC, a dynamically generated IP address or a dynamically assigned IP address, for example. The SEED value is expected to change over time, and time series data is re-assigned to the new SEED value.

The methods described herein do not require the device to participate with the upstream dynamic attribute matching system for collection or expressing any specific value or attribute in addition to those already available by default and part of natural communication. The non-intrusive method is designed to take multiple inputs and compare those inputs to multiple time series data sets which were associated with various SEEDs.

In an embodiment, there is no predefined limit as to how many input data values can be processed or compared, nor is there a limit to the number of time series data sets which the values can be compared to. The only known limitation is computational resources for processing and time constraints by which to generate a final summarized comparison.

In an embodiment, the method enables to compare, and subsequently score incoming compared values to time series data sets for multiple seeds simultaneously. The final association would be for the data sets that most closely matched to the communicating device. The comparison, as noted sees to find a "distance" to the time series data sets. Since dynamic values change over time, some subjected to pseudo randomization, others subject incremental adjustment —it's the relative nature of the comparison which provides the ability to score results. Data sets compared are weighted by the quality of the input data type and distance (calculated drift, likeness, or other algorithmic match or quantitative evaluation).

In an embodiment, data which is processed for comparison, can be compared to the time series data in a pair-wise fashion or be multi-factored. Both positive and negative scoring may be used to drive a relative association and subsequent matching. An expression of how this can be measured (non-exclusive) includes a four-quadrant plot using the y-axis to denote quality of a type of value, and x-axis to denote accuracy, quantitative measure, or distance of a comparison. Vectors can be added together, or processed in a different way, to provide a total confidence (score) of the compared data sets.

Embodiments of the present invention enable device identification by not seeking absolute endpoint identification (as is common today), but seeks a method which is able to capture dynamic data sets, values or attributes and compares those to time series data sets collected over time. The method processes dynamic data (markers), and score those against larger data sets which were generated from devices during previous communication session on the managed network. The method does not require a device to produced added communication sessions to remain non-intrusive. By programmatically comparing how close (referred to as "distance" and "matching" in this document) these values or attributes are to time series data sets, and by combing results from multiple comparisons, predictive associations can be made between devices observed on the network and those which had previously been active on the network. The previously observed devices do not need to have been uniquely identified, but only require behavioural associations to multiple data sets.

By this method, a device which enables randomized MAC addresses and has never been known to use a persistent or predictive value, can still be dynamically associated across multiple communications sessions. Systems using this method can then apply appropriate network policy to device instances using dynamic values for identification and association.

In an embodiment of the invention, existing data sets collected over time (time series) are compared with new data set attributes extracted from locally communicating devices. Data values, identities, transmission sequence numbers, and other dynamically generated data sets may be compared to derive association to previously known devices.

An embodiment of the method targets local network protocols which are used on both protected and unprotected networks and which are subject to long term behavioural analysis by which to feed into a matching algorithm. Extracted values, sequence numbers and in-protocol data identifiers may be listed as inputs used for a matching algorithm. Additional child (vs. Parent) time series values can include derived values by analysing long term behaviour of devices and producing value thresholds. An example of this is developing long term analysis of how a particular device (represented by a variable seed) produces random numbers by which to derive values used for other attributes or identities used by the computer device. Each computer device is only capable of generating a pseudo random number, and by comparing time offsets (relative to absolute time or the EPOC reference time), the associated other values such a transaction IDs can be predicted to be within a certain numerical or alphanumerical range.

In an embodiment, when data sets have been processed, a value (score) is output which is then stacked with all other serialized comparisons to derive a cumulative value (score). The final cumulative score may be used to provide a direct, near or non-association to all known seed values with a confidence level. Using the vectored scoring method described above, a value which is furthest from reference point 0,0 in quadrant I would represent high confidence, whereas a vectored score in the lower quadrant III would represent a non-association. As scores approach 0,0 the confidence on similarity (match) or dissimilarity (non-match) can be made. An alternative evaluation could be addition of all plot tangents (with x,y to 0,0).

Figure 3:
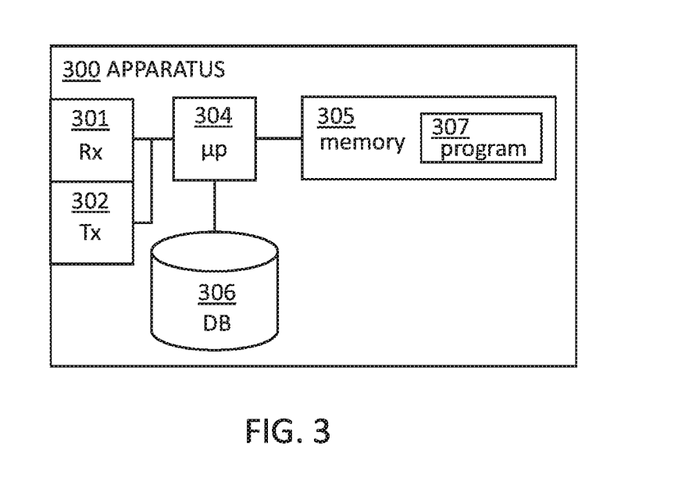
FIG. 3 is a block diagram of an apparatus, according to one embodiment.

Turning now to FIG. 3 that is showing an example of a network apparatus such as a router, a switch, a 5G modem, or other network level apparatus.

A processor 304 is provided that is configured to identify devices in the monitored computer network. The processor 304 is configured to maintain a database of a plurality of time series data sets collected at different points in time, wherein each time series data set is associated to a previously known computer device of a computer network and comprises one or more first data attributes extracted from network traffic data of the previously known computer device. The processor 304 is further configured to detect a connection request from a second computer device of the computer network, collect one or more new data sets related to the second computer device, wherein each data set of the one or more new data sets comprises one or more second data attributes extracted from network traffic data of the second computer device, compare the one or more new data sets related to the second computer device with one or more time series data sets of the plurality of time series data sets maintained in the database, and calculate one or more value scores related to the plurality of time series data sets based on comparing the one or more new data sets related to the second computer device with the one or more time series data sets of the plurality of time series data sets. However, in some embodiments, this analysis can also be implemented in some other device external to the apparatus 300. The processor 304 is further configured to determine a device association score based on the calculated one or more value scores related to the plurality of time series data sets, wherein the device association score determines an association level between the previously known computer device and the second computer device of the computer network.

In an embodiment, the processor 304 is configured to store data such as any network-based identification data, metadata, attributes, values, MAC addresses, hostnames as well as other data related to connection requests, state information and/or domain data to the database 306. The database 306 is shown in this example as being located at the apparatus 300, but it will be appreciated that the apparatus 300 may alternatively access a remote database. The database 306 may comprise necessary data collected from user devices.

The apparatus 300 is provided with a receiver 301 that receives the connection requests and responses. A transmitter 302 is also provided for communication with the computer device and/or the outside server.

In the above description, the apparatus 300 is described as having different transmitter and receiver. It will be appreciated that these may be disposed in any suitable manner, for example in a single transmitter and receiver, a transceiver and so on. Similarly, a single processor 304 is described but it will be appreciated that the function of the processor may be performed by a single physical processor or by more than one processor.

The apparatus 300 is also provided with a non-transitory computer readable medium in the form of a memory 305. The memory may be used to store a computer programme 307 which, when executed by the processor 300, causes the processor 304 to perform the functions described above. The computer program 307 may be provided from an external source. In an embodiment, at least some or even all the functions of the method can be implemented in any apparatus, for example any user device or a server.

Figure 4:
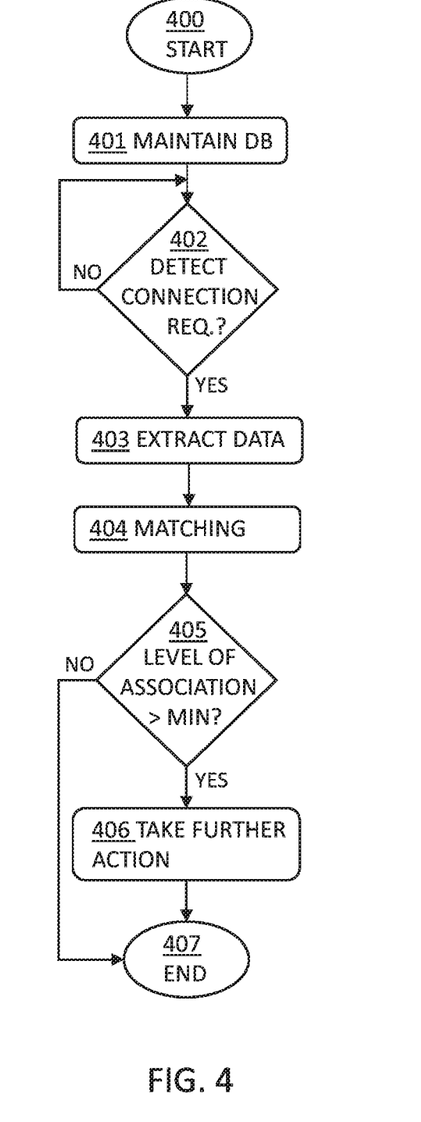
FIG. 4 a flow diagram illustrating a process according to one embodiment.

FIG. 4 is a flow diagram illustrating a process according to one embodiment.

The method starts in 400. In 401, a database is maintained that stores at least a plurality of time series data sets collected at different points in time is maintained, wherein each time series data set is associated to a previously known computer device of a computer network and comprises one or more first data attributes extracted from network traffic data of the previously known computer device. In 402, new connection requests are monitored in the computer network and if a connection request from a second computer device detected, then 403 is entered where one or more new data sets related to the second computer device are collected, wherein each data set of the one or more new data sets comprises one or more second data attributes extracted from network traffic data of the second computer device.

In 404, matching between the new data sets and the stored time series data sets is made.

In 405, if based on the matching result, an association level between the second computer device and the previously known device exceeds a predetermined minimum threshold value, then 406 is entered. Otherwise, the process ends in 407.

Figure 5:
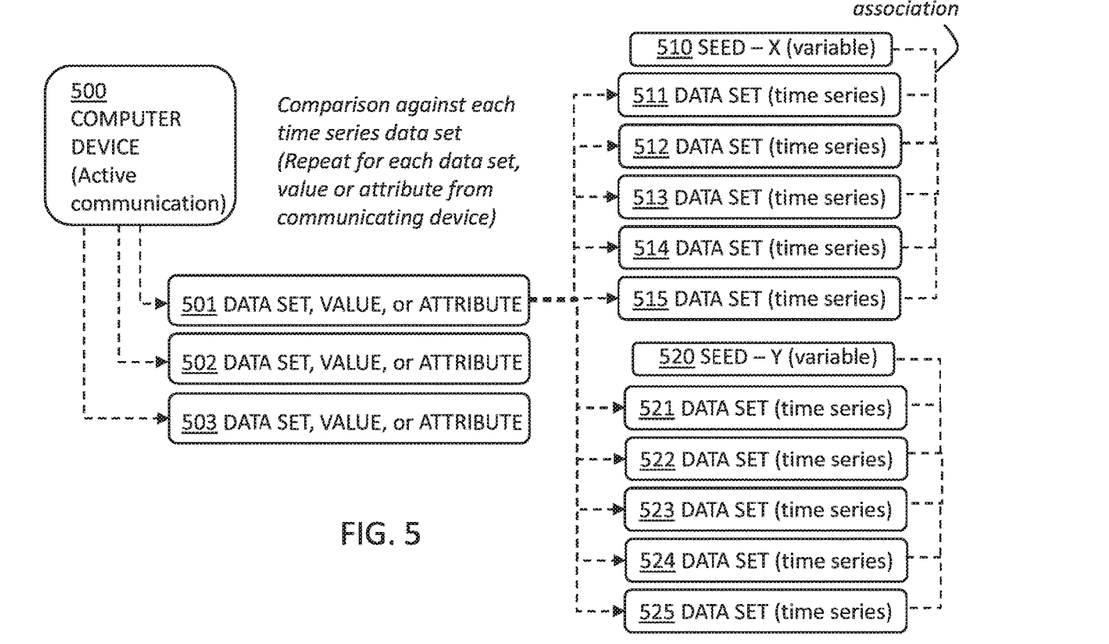
FIG. 5 is a use case example illustrating an embodiment.

In 406, further action, such as policy enforcement, can be taken based detecting that the association level between the second computer device and the previously known device exceeds the threshold value or confidence level FIG. 5 is an example illustrating an embodiment where extracted data sets, values, or attributes (501, 502, 503) from a computer device 500, are listed as inputs used for a matching algorithm and dynamic association of a computer device with any known seed value 510, 520 is made. Comparison is made against each time series data set 511-515 and 521-525 and repeated for each data set, value or attribute (501, 502, 503) extracted from the computer device 500. Since each time series data set 511-515, 521-525 is associated with a known seed value, a dynamic association can be made based on the comparison.

Next, a use case method example is presented.

Time Series Generation:

DHCPv4 packets are captured for all devices communicating on a local network. The DHCP transaction ID is extracted from the network and each time stamped and stored in a time series data base. The current source MAC is associated with this data stream. Other data from other protocols are also extracted from the network and kept in a time series data base and associated to the same SEED (random MAC).

Active Extraction:

A device begins communicating on a network. The DHCP transaction ID is extracted from the network (packet capture) and processed for comparison. Processing in this example would use the full transaction ID for further comparison.

Comparison:

The transaction ID is compared with N number of data sets which stored previous transactions IDs. The new value captured is logically subtracted from each stored value on each DHCP time series data sets for each SEED. The value will not match any of those in the any of the time series data sets, but the value will have an off-set (distance) calculated. The summary of the total offset (comparison against all or a subset of the time series values for each set) is calculated. If the distance is relatively close to one of the data sets, a high score is applied. A higher score is applied to all other comparisons that are "further" away.

Figure 9:
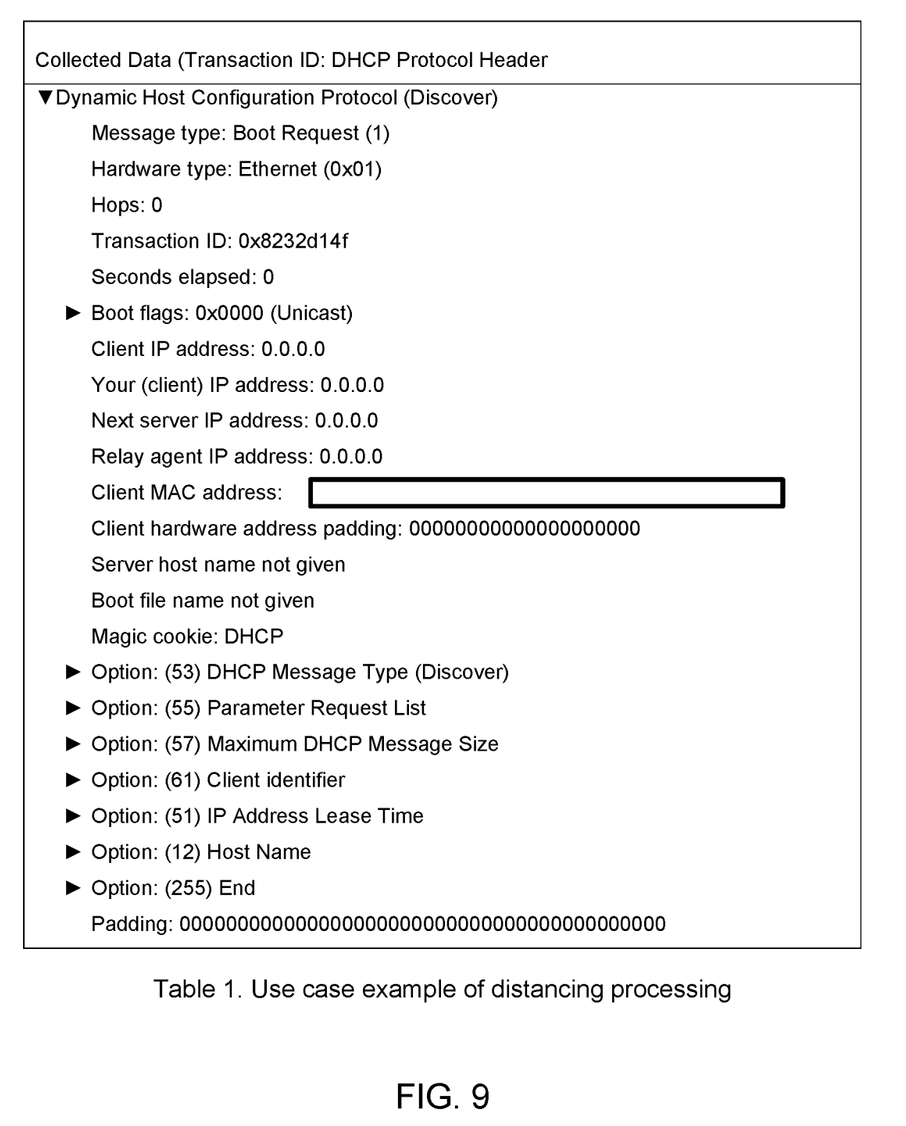
FIG. 9 illustrates a table that describes a use case example embodiment related to distancing processing.

FIG. 9 illustrates a Table 1 that describes a use case example embodiment related to distancing processing.

In the example case related to Table 1, value 0x8232d14f is extracted (dynamic value). This value is compared to time series value sets where set 1 comprises the following values:

Set 1
Time-offset X—0x8201d14f
Time-offset Y—0x8204d14f
Time-offset Z—0x8220d14f
Distance from Y for set 1 is 0x002e0000, which is determined to be a low score.
Values for Set 2 are:
Time-offset X—0x8232d12f
Time-offset Y—0x8232d131
Time-offset Z—0x8232d135
Distance from Y for set 2 is 0x0000001a, which is determined to be a high score.

Thus, the dynamic value in this example has a high match potential with a seed associated with set 2.

In an embodiment processing example, if an IPv6 Address is chosen as the comparable attribute, it will be processed for computational efficiency for comparison. All addresses are 128-bits long, but only the latter 64-bits are dynamic in nature and applicable to a given subnet. It can be assumed for all host operation, the first 64-bits can be truncated.

If the IP address is 2001:db8:1234:5678:abcd:abcd:1234:1234, only the second part of the address (64-bits) need be compared with previous values. The processed value would be "abcd:abcd:1234:1234"). Although the value used for host address bits are based on pseudo random process, over time, the number of permutations or potential values which can be used will potentially be within a range with defined limits.

Stacking and Matching:

In an embodiment, each independent data value, set or attribute compared will result in a score which is relative to all comparisons made. Scores can be expressed as a simple integer value, real number or a vector score if desired (as on a X,Y plot or plot set). Separate comparisons are made for each type of value extracted (and processed if needed). Stacking refers to combining the relative scores to provide an overall aggregate distance to a given SEED. If plots are used, then a simple addition of tangents (relative to 0,0) can be used or the plots can be processed in an alternative way. In all comparisons, relative weighting of the quality of a given comparison, and the absolute value of the comparison are included in the score.

Figure 6:
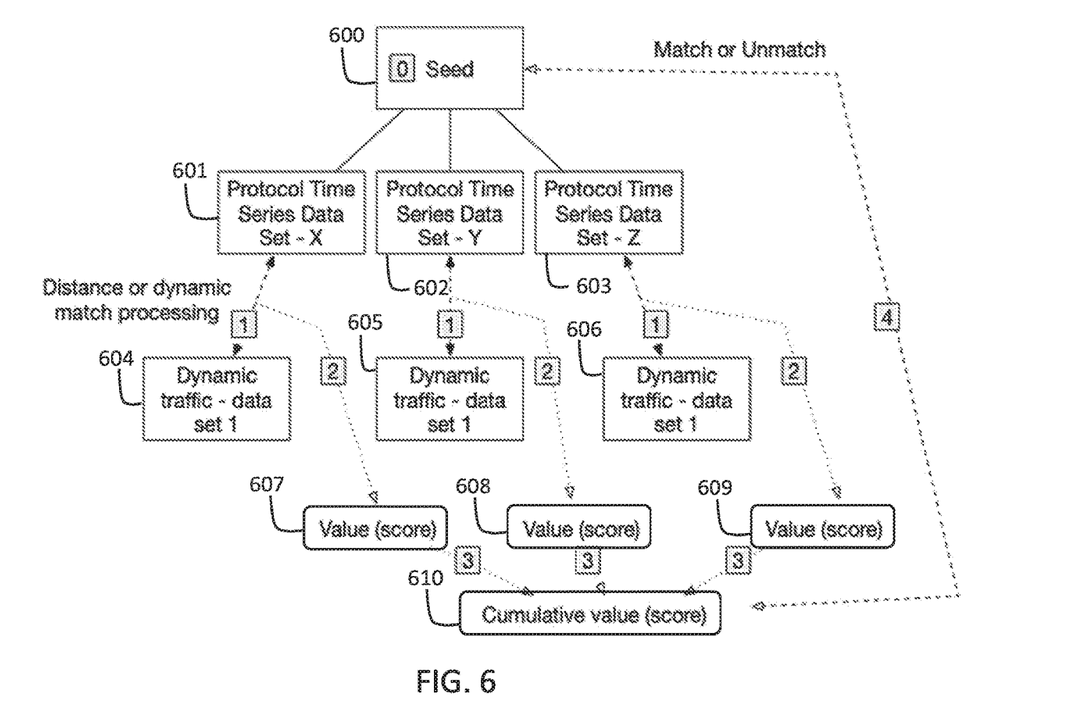
FIG. 6 is another example illustrating an embodiment.

Each comparison is scored. Scored values are combined for an aggregate (cumulative) score. This final score is used to match (or unmatched) to known SEEDs (Seeds are associated with known time series data sets from known protocols). FIG. 6 provides a conceptual view of this operation.

In the example illustration of FIG. 6, a seed value 600 is set to act as the primary identifier value. Dynamic data sets 601, 602, 603 from protocols used on a local network are captured and stored in a time series database. Collected dynamic traffic data 604, 605, 606 and the dynamic data sets 601, 602, 603 are processed and compared (for given protocol type). Relative value scores 607, 608, 609 are assigned. The scoring can be adjusted over time based on longer term predictability. All the value scores 607, 608, 609 are then aggregated (stacked with all other serialized comparisons) to produce a final cumulative value score 610. The final cumulative score 610 is matched to closest seed, or unmatched to all seeds if score is too low for predictable match.

Scoring may be further enhanced by applying a scoring framework which utilizes large data sets to determined potential distance. As an example, although transaction IDs use a dynamic value upon boot (before sequential increments during runtime), it is possible that over the course of a year, the range of seed values used to generate a random start point can be predicted and/or qualified in terms of a range of values or values with given thresholds, used by a given endpoint. Any number is at best a pseudo random number with increasing predictability over long periods of time.

Algorithm Walkthrough Example:

In an embodiment, a device connecting to network allows extraction communication of metadata that is presented in FIG. 5. One of attribute examples is DHCP transaction ID that is part of the dataset shown in example of FIG. 5. Extracted transaction ID is further processed according to timeseries by adapting matching algorithm. Values are compared with the ones stored in timeseries on the cloud for timeseries pattern shown in the example of FIG. 6.

In an embodiment, attribute distance and dynamic match is measured to most recent device communication timeseries attributes, such as transaction ID, stored in the cloud and weight values for the current communication is evaluated in comparison with the stored data. If precision for distance and dynamic match comparison is high enough, decision is made, and device identity established, and algorithm stores the most recent data.

In an example usecase according to an embodiment, in order to access certain company resources, device must have a profile attached to it. Management system needs to identify the device before applying the profile to it and devices with randomized MAC are unknowns for management systems with most of them relying on MAC addresses as unique identifiers of a specific device. During device communication analysis presented in some embodiments, the device is identified, and correct profiles are applied.

The system and therefore algorithm is intended to advance through standard machine learning. As the system operates in production, new value matching and feature extraction can occur for values which, over time, may be deemed to be capable of supplying a positive or negative association. Machine learning is needed to process large data sets, and adding in comparisons for those data sets, add new training angles for the machine learning model. Some data sets may need to be compared to time series data that spans weeks, months or even years in some cases.

In an embodiment, data sets, values or attributes are compared to time series data. Time series data is collected over a long (or short) period of time. Devices in most networks move off and onto a network (or between networks) by nature. Capturing new data and comparing it to previously known dynamic data allows for key matching functions to occur. The first is distance matching which determines how close a value or set of data, value or attribute, is to time series data. The time series data is associated with a seed value that changes over time and need not be consistent for this system. The second matching method is dynamic value comparison using computed output to associate to a time series data set. By computed, we mean the system can split data sets apart, perform algebraic or arithmetic operations or extract other meaning from the incoming data. An example meaning in this context could be a sequence number is reset to 0 in which case a device may be assumed to have "restarted" or "rebooted".

The distance comparison may include numerical/alphanumerical comparison to previous time series values to determine a distance (an integer or other established offset, for example). The distance comparison may also comprise comparison of distance to time offset (from time series) to determine a relative match or performing a non-match against all other seed values to establish negative associations (e.g. if X is NOT A, B, C or D, then it can be E). The dynamic value matching may comprise comparing data sets taken from traffic streams on a byte by byte basis against known time series values to establish pattern match. It can also comprise comparing data to a full time series data set to find a direct positive match or to establish known negative matches.

Figure 7:
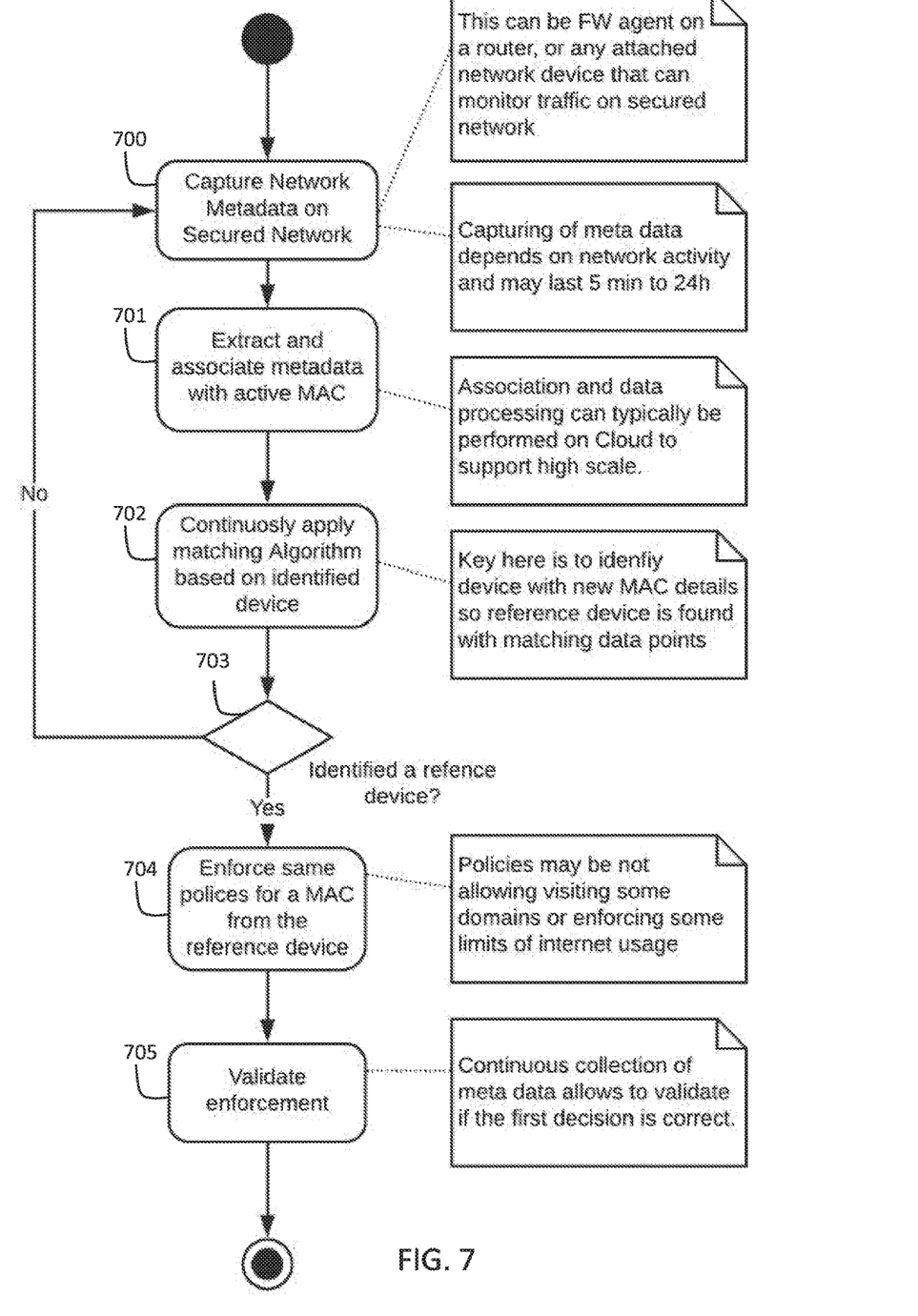
FIG. 7 illustrates an example use case process flow according to an embodiment.

FIG. 7 illustrates an example use case process flow of the comparison concept according to an embodiment. It illustrates the comparison to time series data sets associated with dynamic SEED values. High level diagram shows process how to associate MAC with reference MAC if such device existed before on the network. There are assumptions that all previous MACs are identified, and reference data points are collected so new MACs on the network will be evaluated to find reference device for enforcements. In case it finds with high confidence, policies are applied. It is important to continue collecting more evidence to validate that the decision was made right. Validation step allows to either continue applying policies or reject those policies and associate that MAC as a separate device/entity.

In 700, network metadata, data sets, values or attributes are extracted from network protocols which a device uses to communicate on a local network. In an embodiment, an FW agent on a router, or any attached network device that can monitor traffic on secured network can capture the collected data. In an embodiment, capturing of metadata depends on network activity and may last, for example, between 5 minutes to 24 hours or between any other time range.

In 701, the metadata is extracted and associated with an active MAC. In an embodiment, the association and data processing may be performed on a cloud service to support high scale data processing.

In 702, a matching algorithm is continuously applied based on an identified device. Key here is to identify a device with new MAC details so that a reference device is found with matching data points.

In 703, if a reference device is identified, then 704 is entered. Otherwise the process returns to 700.

In 704, same policies are enforced for the MAC than for the reference device. In an embodiment, the policies prohibit visiting specific domains or enforces certain limits to Internet usage.

In 705, the enforcement of the policies is validated by continuous collection of metadata. Thus, it can be determined whether the first decision was correct.

Figure 8:
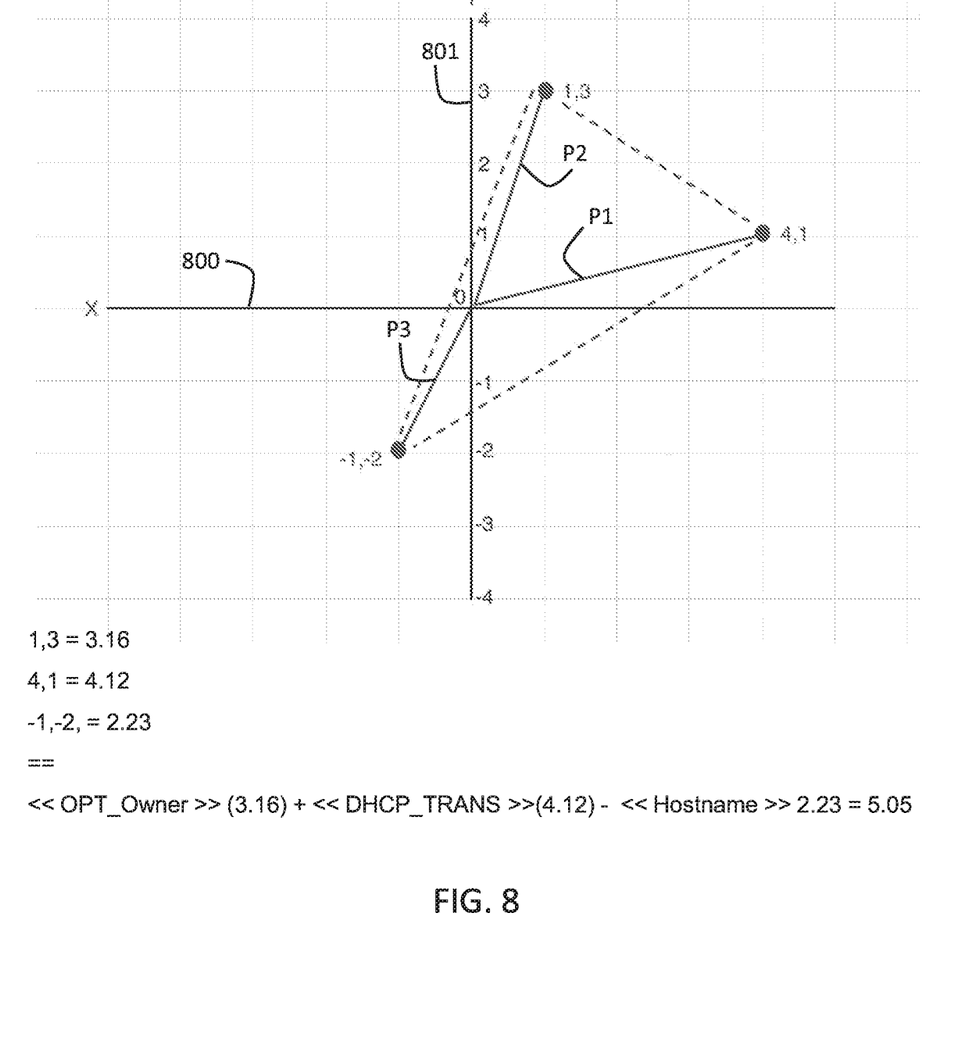
FIG. 8 is a use case example illustrating relative plot scoring according to an embodiment.

FIG. 8 illustrates an example of relative plot scoring according to an embodiment. The relative plot scoring allows for both quality of data type (y-axis) 801 to be evaluated in addition to "closeness" or "distance" of the value comparison (x-axis) 800. These plots can supply positive (quadrant I) plots—for comparisons which indicate the devices may be similar to a known device; or negative (quadrant III) plots for comparisons which indicate the devices is potentially not similar to the known device. The plots can be evaluated independently (as tangents to 0,0) or together (simple addition, or other arithmetic function applied). This scoring method allows for the arithmetic expression used to cumulate the scores (plots) to change over time based on new ways of evaluating the relationships.

In the example of FIG. 8, the following synthesized values were used:

Plot 1 (P1)—1,3 (DNS Owner, 24-bit match on 48-bit truncated value)
Low score as only 24 bits match, but DNS owner is considered a high (y4) value type Plot 2 (P2)—4, 1 (DHCP Transaction ID, which differs by 0x0000001F)
High score since transaction ID is only 0x1F (decimal 31) away from timeseries value, but transaction IDs are less valuable Plot 3 (P3)—-1,-2 (Hostname has 4 additional characters "iPad (3)" vs "iPad")
Moderate low score since there is a high similarity, but Hostname is a moderate value indicator of device identity.

In case this was evaluated as a direct evaluation of tangent values, it would allow for the relative high scores of the first two plots to be moderated by the single plot of the third value. It would provide the following result of 5.05 (without negative plot, the result is 7.28).

In an embodiment, identifying device models changing their network-based identification data is enabled. This information can be associated to model definitions underlying which device types are prone to this kind of behaviour and can later be used to reduce occurrences where user intervention would be necessary.

In an embodiment, an attribute association system may perform one or more of the following processes:

Reading traffic metadata on router or other carrier level communication data.

For each transaction, reading meta data from: DHCPv4 (Internet Standard RFC2131), DHCPv6 (Internet Standard RFC3315), mDNS (Internet Standard 6762), SSDP (Industry Standard by UPnP.Org), UPnP Messages (Industry Standard by UPnP.Org) and IPv6 (Internet Standard RFC8200).

Handling data transaction timeseries.

Keeping timeseries mapping to extracted metadata for distance comparison and dynamic value matching.

Based on Machine Learning and statistical model combinations, determining if the state distance and/or dynamic value is satisfactory for decision making in near real time fashion.

Enforcing policies on detected network entities based on Attribute Association Algorithm decision.

Validating the enforced policies re-evaluating Attribute Association Algorithm decision by continuous metadata collection and timeseries extension.

Match on any seed (dynamic/ephemeral) value using time-series comparisons with near-real time communication data (vs. Traditional set seed data sets).

It will be appreciated that various modifications may be made to the above described embodiments without departing from the scope of the present invention. For example, the database or analysis engine may be in separate entities to the apparatus, in which case the apparatus will send queries remotely to the analysis engine.

The steps, signalling messages and related functions described above in relation to the figures are in no absolute chronological order, and some of the steps may be performed simultaneously or in a different order. Other functions may also be executed between the steps and other signalling may be sent between the illustrated ones. Some of the steps can also be left out or replaced by a corresponding step. The system functions illustrate a procedure that may be implemented in one or more physical or logical entities.

The techniques described herein can be implemented by various means. An apparatus or system that implements one or more of the described functions may comprise not only existing means but also means for implementing one or more functions of a corresponding apparatus that is described with an embodiment. An apparatus or a system may also comprise separate means for each separate function. For example, the embodiments may be implemented in one or more modules of hardware or combinations thereof. For software, implementation can be through modules, for example such procedures and functions that perform the functions described. The software code may be stored in any suitable data storage medium that is readable by processors, computers, memory units or articles of manufacture, and may be executed by one or more processors or computers. The data storage medium or memory unit or database may be implemented within the processor or computer apparatus, or as an external part of the processor or computer apparatus.

The programming, such as executable code or instructions, electronic data, databases or other digital information may be stored into memories and can include a processor-usable medium embodied in any computer program product which can contain, store, or maintain programming, data or digital information for use by or in connection with an instruction execution system, such as the processor.

An embodiment provides a non-transitory computer-readable medium comprising stored program code comprised of computer-executable instructions. The computer program code comprises a code for maintaining a database of a plurality of time series data sets collected at different points in time, wherein each time series data set is associated to a previously known computer device of a computer network and comprises one or more first data attributes extracted from network traffic data of the previously known computer device; a code for detecting a connection request from a second computer device of the computer network; a code for collecting one or more new data sets related to the second computer device, wherein each data set of the one or more new data sets comprises one or more second data attributes extracted from network traffic data of the second computer device; a code for comparing the one or more new data sets related to the second computer device with one or more time series data sets of the plurality of time series data sets maintained in the database; a code for calculating one or more value scores related to the plurality of time series data sets based on comparing the one or more new data sets related to the second computer device with the one or more time series data sets of the plurality of time series data sets; and a code for determining a device association score based on the calculated one or more value scores related to the plurality of time series data sets, wherein the device association score determines an association level between the previously known computer device and the second computer device of the computer network.

Although the invention has been described in terms of preferred embodiments as set forth above, these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
    detecting a connection request from a second computer device of a computer network;
    collecting one or more new data sets related to the second computer device, wherein each data set of the one or more new data sets comprises one or more second data attributes extracted from network traffic data of the second computer device;
    comparing the one or more new data sets related to the second computer device with one or more time series data sets maintained in a database comprising a plurality of time series data sets collected at different points in time, wherein each time series data set is associated with a predetermined identifier value of a previously known computer device of the computer network and comprises one or more first data attributes extracted from network traffic data of the previously known computer device, and wherein for each predetermined identifier value of the previously known computer device a plurality of time series data sets collected at different points in time are associated;
    calculating one or more value scores related to the plurality of time series data sets based on comparing the one or more new data sets related to the second computer device with the one or more time series data sets of the plurality of time series data sets;
    determining a device association score based on the one or more value scores related to the plurality of time series data sets, wherein the device association score determines an association level between the previously known computer device and the second computer device of the computer network;
    based on the device association score, determining whether the second computer device is a same computer device as the previously known computer device; and
    in response to determining that the second computer device is the same computer device as the previously known computer device, applying a same policy to the second computer device as previously applied to the previously known computer device, the policy comprising at least one of a communications policy and a network policy.

2. The method according to claim 1, wherein the one or more new data sets related to the second computer device and the one or more time series data sets of the plurality of time series data sets are related to a specific network protocol used on the computer network.

3. The method according to claim 2, wherein the specific network protocol comprises one or more of: Dynamic Host Configuration Protocol Version 4 (DHCPv4), Dynamic Host Configuration Protocol Version 6 (DHCPv6), Multicast Domain Name Service (mDNS), Simple Service Discovery Protocol (SSDP), Universal Plug-n-Play Messages (UPnP Messages), and Internet Control Message Protocol Version 6 (ICMPv6).

4. The method according to claim 1, wherein the first data attributes and the second data attributes extracted from the network traffic data comprise one or more of: a Media Access Control (MAC) address, a hostname, a transmission sequence number, a communication timestamp, a communication protocol, a source port, a server name indication, a Transmission Control Protocol (TCP) window size, a total length of packet, a referrer, and any network-based identifier data.

5. The method according to claim 1, further comprising setting one or more primary identifier values related to the previously known computer device based on the one or more first data attributes; and wherein determining the device association score is further based on the one or more primary identifier values.

6. The method according to claim 1, wherein one or more matching algorithms are used in one or more steps of: comparing the one or more new data sets related to the second computer device with one or more time series data sets of the plurality of time series data sets; calculating the one or more value scores related to each of the plurality of time series data sets; and determining the device association score.

7. The method according to claim 1, wherein comparing the one or more new data sets related to the second computer device with the one or more time series data sets further comprises using distance comparison and/or dynamic value matching.

8. The method according to claim 7, wherein the distance comparison comprises one or more of: a numerical and/or alphanumerical comparison to previous time series values to determine a distance between the first data attributes and the second data attributes; comparing a distance to time offset from time series to determine a relative match; and determining a non-match to establish negative associations.

9. The method according to claim 7, wherein the dynamic value matching comprises one or more of: comparing the first data attributes and the second data attributes on a byte-by-byte basis to establish a pattern match; and comparing to a full time series data set to find a direct positive match, or to establish one or more known negative matches.

10. The method according to claim 7, wherein comparing further comprises measuring a distance and dynamic match to most recent communication timeseries attributes and evaluating weight values for current communication in comparison with data maintained in the database.

11. The method according to claim 7, wherein the step of comparing the one or more new data sets related to the second computer device with the one or more time series data sets further comprises evaluating quality of the one or more new data sets by using relative plot scoring, and wherein the device association score further determines a relative weight of the quality of the comparison and an absolute value of the comparison.

12. The method of claim 1 wherein the predetermined identifier value of the previously known computer device comprises one of a randomized MAC address of the previously known computer device and a dynamically assigned Internet Protocol (IP) address of the previously known computer device, and wherein the second computer device has a different predetermined identifier value than the predetermined identifier value of the previously known computer device.

13. The apparatus in a computer network system comprising:
one or more processors; and
a non-transitory computer-readable medium comprising stored program code, the program code comprised of computer-executable instructions that, when executed by the one or more processors, cause the one or more processors to:
detect a connection request from a second computer device of a computer network;
collect one or more new data sets related to the second computer device, wherein each data set of the one or more new data sets comprises one or more second data attributes extracted from network traffic data of the second computer device;
compare the one or more new data sets related to the second computer device with one or more time series data sets maintained in a database comprising a plurality of time series data sets collected at different points in time, wherein each time series data set is associated with a predetermined identifier value of a previously known computer device of the computer network and comprises one or more first data attributes extracted from network traffic data of the previously known computer device, and wherein for each predetermined identifier value of the previously known computer device a plurality of time series data sets collected at different points in time are associated;
calculate one or more value scores related to the plurality of time series data sets based on comparing the one or more new data sets related to the second computer device with the one or more time series data sets of the plurality of time series data sets;
determine a device association score based on the one or more value scores related to the plurality of time series data sets, wherein the device association score determines an association level between the previously known computer device and the second computer device of the computer network;
based on the device association score, determine whether the second computer device is a same computer device as the previously known computer device; and
in response to determining that the second computer device is the same computer device as the previously known computer device, applying a same policy to the second computer device as previously applied to the previously known computer device, the policy comprising at least one of a communications policy and a network policy.

14. The apparatus according to claim 13, wherein the one or more new data sets related to the second computer device and the one or more time series data sets of the plurality of time series data sets are related to a specific network protocol used on the computer network.

15. The apparatus according to claim 13, the one or more processors being further configured to: set one or more primary identifier values related to the previously known computer device based on the one or more first data attributes; and wherein determining the device association score is further based on the one or more primary identifier values.

16. The apparatus according to claim 13, wherein one or more matching algorithms are used in one or more steps of: comparing the one or more new data sets related to the second computer device with one or more time series data sets of the plurality of time series data sets; calculating the one or more value scores related to each of the plurality of time series data sets; and determining the device association score.

17. The apparatus according to claim 13, wherein the distance comparison comprises one or more of: a numerical and/or alphanumerical comparison to previous time series values to determine a distance between the first data attributes and the second data attributes; comparing a distance to time offset from time series to determine a relative match; and determining a non-match to establish negative associations.

18. The apparatus according to claim 13, the one or more processors being further configured to compare the one or more new data sets related to the second computer device with the one or more time series data sets by evaluating quality of the one or more new data sets by using relative plot scoring, and wherein the device association score further determines a relative weight of the quality of the comparison and an absolute value of the comparison.

19. A non-transitory computer-readable medium comprising stored program code, the program code comprised of computer-executable instructions that, when executed by a processor, cause the processor to:
detect a connection request from a second computer device of a computer network;
collect one or more new data sets related to the second computer device, wherein each data set of the one or more new data sets comprises one or more second data attributes extracted from network traffic data of the second computer device;
compare the one or more new data sets related to the second computer device with one or more time series data sets maintained in a database comprising a plurality of time series data sets collected at different points in time, wherein each time series data set is associated with a predetermined identifier value of a previously known computer device of the computer network and comprises one or more first data attributes extracted from network traffic data of the previously known computer device, and wherein for each predetermined identifier value of the previously known computer device a plurality of time series data sets collected at different points in time are associated;
calculate one or more value scores related to the plurality of time series data sets based on comparing the one or more new data sets related to the second computer device with the one or more time series data sets of the plurality of time series data sets;

determine a device association score based on the one or more value scores related to the plurality of time series data sets, wherein the device association score determines an association level between the previously known computer device and the second computer device of the computer network;

based on the device association score, determine whether the second computer device is a same computer device as the previously known computer device; and in response to determining that the second computer device is the same computer device as the previously known computer device, applying a same policy to the second computer device as previously applied to the previously known computer device, the policy comprising at least one of a communications policy and a network policy.

* * * * *